US008654962B2

(12) United States Patent
Ku et al.

(10) Patent No.: US 8,654,962 B2
(45) Date of Patent: *Feb. 18, 2014

(54) SYSTEM AND METHOD OF DELIVERING RINGBACK AUDIO CONTENT

(71) Applicant: AT&T Intellectual Property, I, L.P., Atlanta, GA (US)

(72) Inventors: Bernard Ku, Austin, TX (US); Mehrad Yasrebi, Austin, TX (US); Douglas Lin, Dallas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,293

(22) Filed: Mar. 19, 2013

(65) Prior Publication Data

US 2013/0230161 A1    Sep. 5, 2013

Related U.S. Application Data

(63) Continuation of application No. 11/959,902, filed on Dec. 19, 2007, now Pat. No. 8,401,169.

(51) Int. Cl.
*H04M 3/00* (2006.01)
*H04L 12/66* (2006.01)

(52) U.S. Cl.
USPC .......................................... 379/257; 370/352

(58) Field of Classification Search
USPC ................. 370/352, 353, 354, 355, 356, 357; 379/399, 142, 220, 211, 257; 725/110
See application file for complete search history.

(56) References Cited

U.S. PATENT DOCUMENTS

| | | | |
|---|---|---|---|
| 7,602,901 | B1 | 10/2009 | Kates et al. |
| 2004/0120494 | A1 | 6/2004 | Jiang et al. |
| 2004/0223605 | A1 | 11/2004 | Donnelly |
| 2006/0029045 | A1 | 2/2006 | Robayashi et al. |
| 2006/0029046 | A1 | 2/2006 | Nishida et al. |
| 2006/0165059 | A1 | 7/2006 | Batni et al. |
| 2006/0245571 | A1 | 11/2006 | Radziewicz et al. |
| 2006/0291638 | A1 | 12/2006 | Radziewicz et al. |
| 2007/0061397 | A1 | 3/2007 | Gregorat et al. |
| 2007/0071221 | A1 | 3/2007 | Allen et al. |
| 2007/0116253 | A1 | 5/2007 | Batni et al. |
| 2007/0127642 | A1 | 6/2007 | Bae et al. |
| 2007/0127663 | A1 | 6/2007 | Bae et al. |
| 2007/0180485 | A1 | 8/2007 | Dua |
| 2007/0211872 | A1 | 9/2007 | Cai et al. |
| 2009/0010250 | A1 | 1/2009 | Ganesan et al. |
| 2009/0119164 | A1 | 5/2009 | Colson et al. |
| 2010/0095337 | A1 | 4/2010 | Dua |

*Primary Examiner* — Ahmad Matar
*Assistant Examiner* — Kharye Pope
(74) *Attorney, Agent, or Firm* — Akerman LLP; Michael K. Dixon; Roy P. Zachariah

(57) ABSTRACT

A system and method of delivering ringback audio content are disclosed. In one embodiment, the method includes receiving a connection request at an originating serving call session control function (S-CSCF) network element. The connection request indicates that a caller device has placed a call to a destination device associated with a ringback audio content service subscriber. The method also includes receiving a plurality of naming authority pointer (NAPTR) records at the originating S-CSCF network element from a telephone number mapping (ENUM) server. The NAPTR records include a plurality of ringback audio uniform resource indicators (URIs) associated with the destination device. The method also includes modifying the connection request to include the plurality of ringback audio URIs.

20 Claims, 11 Drawing Sheets

US 8,654,962 B2

SYSTEM AND METHOD OF DELIVERING RINGBACK AUDIO CONTENT

CROSS-REFERENCE TO RELATED APPLICATIONS

This application is a continuation of U.S. patent application Ser. No. 11/959,902 filed on Dec. 19, 2007, now U.S. Pat. No. 8,401,169, which is hereby incorporated by reference in its entirety.

FIELD OF THE DISCLOSURE

The present disclosure generally relates to communications networks, and more particularly relates to delivering ringback audio content.

BACKGROUND

Calling parties often experience a wait time after dialing and before a called party answers. In some cases, the called party may be busy with another call or may be temporarily away from his or her phone. A caller met with a busy signal or a voicemail greeting may simply hang up and try again. Re-dialing attempts can contribute to network congestion by increasing network traffic.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods, records, or computer-readable media. Moreover, some statements may apply to some innovative features but not to others.

Figure 1:
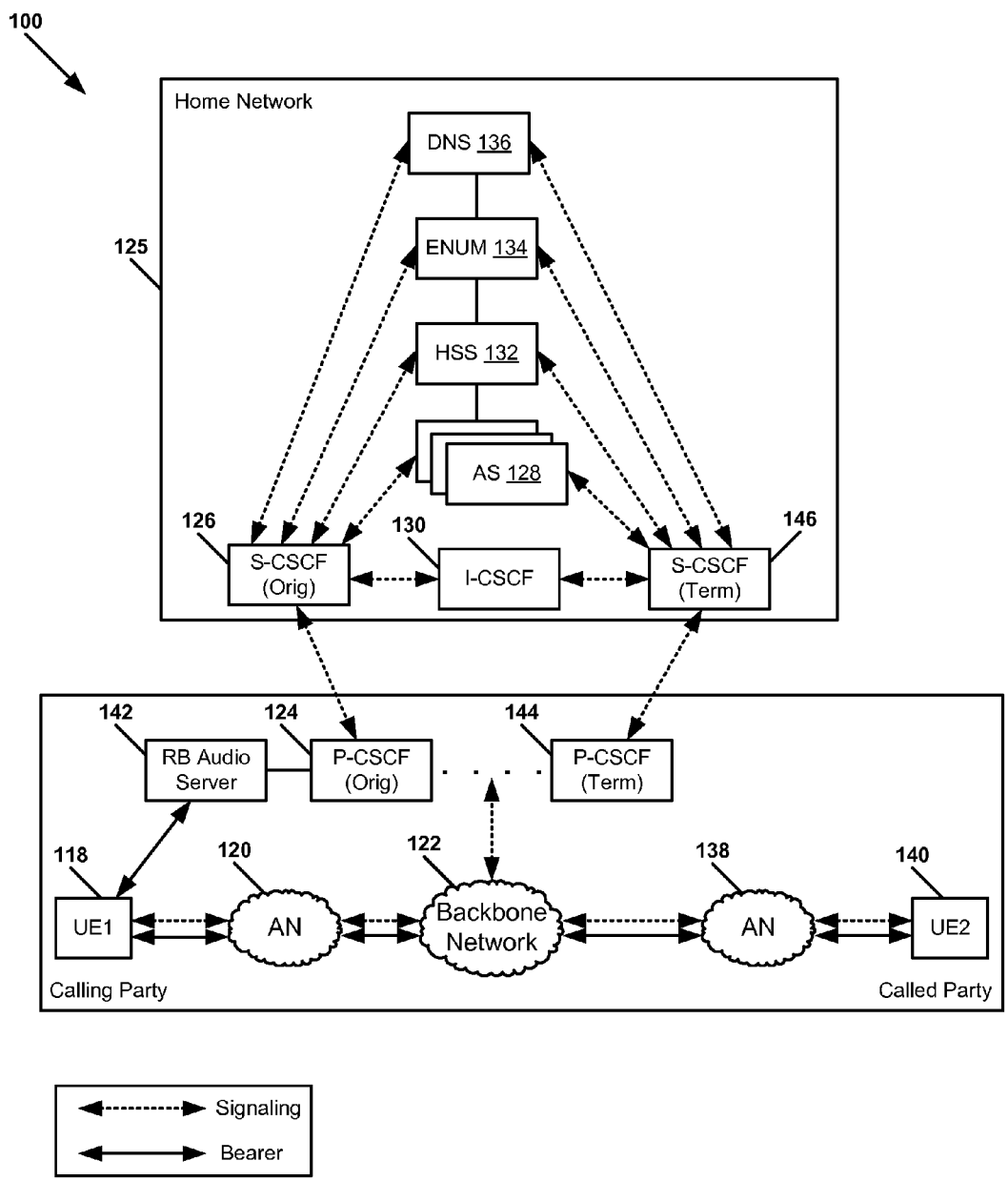
FIG. 1 is a block diagram illustrating a particular embodiment of a system to deliver ringback audio content.

FIG. 1 illustrates a particular embodiment of a system 100 to deliver ringback audio content. The system 100 can include various elements of an Internet protocol (IP) multimedia subsystem (IMS). The system 100 includes a calling party user equipment (UE1) device 118 that communicates with a packet-based backbone network 122 via a first access network 120. The UE1 device 118 may also be adapted to communicate with other circuit-switched or packet-switched networks. The backbone network 122 communicates with at least one second access network 138. A second user equipment (UE2) device 140, such as a called party device, communicates with the at least one second access network 138.

In addition, the backbone network 122 communicates with a home network 125, such as a carrier or service provider network associated with the UE1 device 118 and the UE2 device 140, via at least one of a plurality of proxy call session control function (P-CSCF) network elements, such as an originating P-CSCF 124 and a terminating P-CSCF 144. The P-CSCFs 124 and 144 may act as session initiation protocol (SIP) proxies that serve as first points of contact between subscriber terminals, such as the UE1 device 118 and the UE2 device 140, and the home network 125. The P-CSCFs 124 and 144 are adapted to communicate with the home network 125 according to a session initiation protocol. The P-CSCFs 124 and 144 may also be adapted to communicate with a ringback audio server 142. In another embodiment, subscriber devices, such as the UE1 device 118, can communicate with the ringback audio server 142 directly or via an access point other than the P-CSCFs 124 and 144.

In one embodiment, the home network 125 includes an originating serving call session control function (S-CSCF) network element 126 and a terminating S-CSCF 146. The S-CSCFs 126 and 146 function as SIP servers that allow subscriber terminals, such as the UE1 device 118 and the UE2 device 140, to register with the home network 125. The S-CSCFs 126 and 146 communicate via an interrogating call session control function (I-CSCF) network element 130. The S-CSCFs 126 and 146 also communicate with a home subscriber server (HSS) 132. In an illustrative embodiment, the I-CSCF 130 is adapted to query the HSS 132 to find a location of the terminating S-CSCF 146, the terminating P-CSCF 144, the UE2 device 140, or any combination thereof.

In addition, the S-CSCFs 126 and 146 communicate with a plurality of application servers 128. The application servers 128 host and execute various IMS services (e.g., caller identification (ID), call waiting, push-to-talk, subscriber profiling, other services, or any combination thereof). The S-CSCFs 126 and 146 also communicate with a telephone number mapping (ENUM) server 134. The ENUM server 134 can be coupled to a domain name server (DNS) 136. The ENUM server 134 is adapted to store a plurality of naming authority pointer (NAPTR) records, where each NAPTR record is associated with a fully qualified domain name (FQDN) related to a subscriber device, such as the UE1 device 118 or the UE2 device 140.

In an illustrative embodiment, the HSS 132 can be adapted to receive subscriber profile information via an Internet portal, an interactive voice response (IVR) system, or another communication system. For instance, a subscriber can access a website and register with a ringback audio content service provided by the carrier associated with the home network 125. The subscriber can create a profile that includes designations of one or more potential callers and indications of whether each potential caller is a personal contact, a business or commercial contact, or another type of contact. Additionally, the subscriber can designate telephone numbers or other caller identification information associated with each potential caller.

Moreover, the subscriber can indicate uniform resource indicators (URIs) of ringback audio (RBA) selections and a caller or contact type to whom a ringback audio selection associated with each URI is to be sent when a call is placed to the UE2 device 140. RBA selections can be uploaded by the subscriber, selected from a list provided at the web portal, or a combination thereof. For example, the subscriber can designate that a ringback audio content selection indicating a date and time of his or her child's birthday party is to be provided via a first RBA URI to personal contacts; that a ringback audio content selection including a particular song is to be provided via a second RBA URI to one or more particular callers; and that a ringback audio content selection including stock quotes or news is to be provided via a third RBA URI to business contacts.

RBA URIs can correspond to various types of audio content, such as digital music, financial information, news information, advertisements, audio content recorded by the subscriber, sports information, weather information, other types of audio content, or a combination thereof. In an illustrative embodiment, audio content associated with an RBA URI can be periodically updated or otherwise changed. For example, news information associated with a particular RBA URI can be updated on a daily basis. In another example, weather information associated with another particular RBA URI can be updated hourly. In still another example, digital music associated with another RBA URI can be changed from one of a plurality of songs associated with an album or other collection, to another one of the plurality of songs associated with the collection, on a periodic basis. A periodicity of changes to audio content associated with a RBA URI can include a real-time, hourly, daily, weekly, monthly, quarterly, yearly, or other periodic basis.

The subscriber can specify orders and preferences for sending URIs associated with various ringback audio content selections to a caller or contact type. For instance, the subscriber can identify multiple RBA URIs associated with ringback audio selections intended for personal contacts, and the subscriber can specify a sequence in which the RBA URIs are applied to a call from a device associated with a personal contact until the call is answered at the UE2 device 140 or at another device or system, such as a voice mail or messaging system. The sequence can be reflected in an order field value, a preference field value, or a combination thereof, associated with each of the RBA URIs. Information received from the subscriber can be included in a subscriber profile stored at the HSS 132 or an application server 128.

The ENUM server 134 is adapted to obtain and update order values, preference values, RBA URIs, or any combination thereof, from any authorized source, such as the HSS 132 or an application server 128. In one embodiment, the ENUM server 134 periodically scans the HSS 132 or an application server 128 for updates related to an updated RBA URI, an updated order field value, an updated preference field value, an added caller, an added contact, an added contact type, a deleted caller, a deleted contact, a deleted contact type, other information associated with the RBA URIs, or any combination thereof. Updates can include updated information related to current subscribers, new subscribers, or a combination thereof. The ENUM server 134 is adapted to generate NAPTR records based on the RBA URIs and related information. NAPTR records can be stored at the ENUM server 134. In an illustrative embodiment, information associated with a RBA URI can be updated periodically. For instance, a lowest preference field value can be alternated among songs of a collection on a periodic basis.

The originating S-CSCF 126 is adapted to receive a connection request originating from the UE1 device 118. The connection request includes an E.164 number associated with the UE2 device 140 and can also include caller identification, other information, or a combination thereof. According to FIG. 1, dashed and solid lines depict signaling and bearer activities, respectively, between the UE1 device 118 and the UE2 device 140. The call connection request can be received at the S-CSCF 126 via the originating P-CSCF 124. The call connection request can include a SIP INVITE message.

Figure 10:
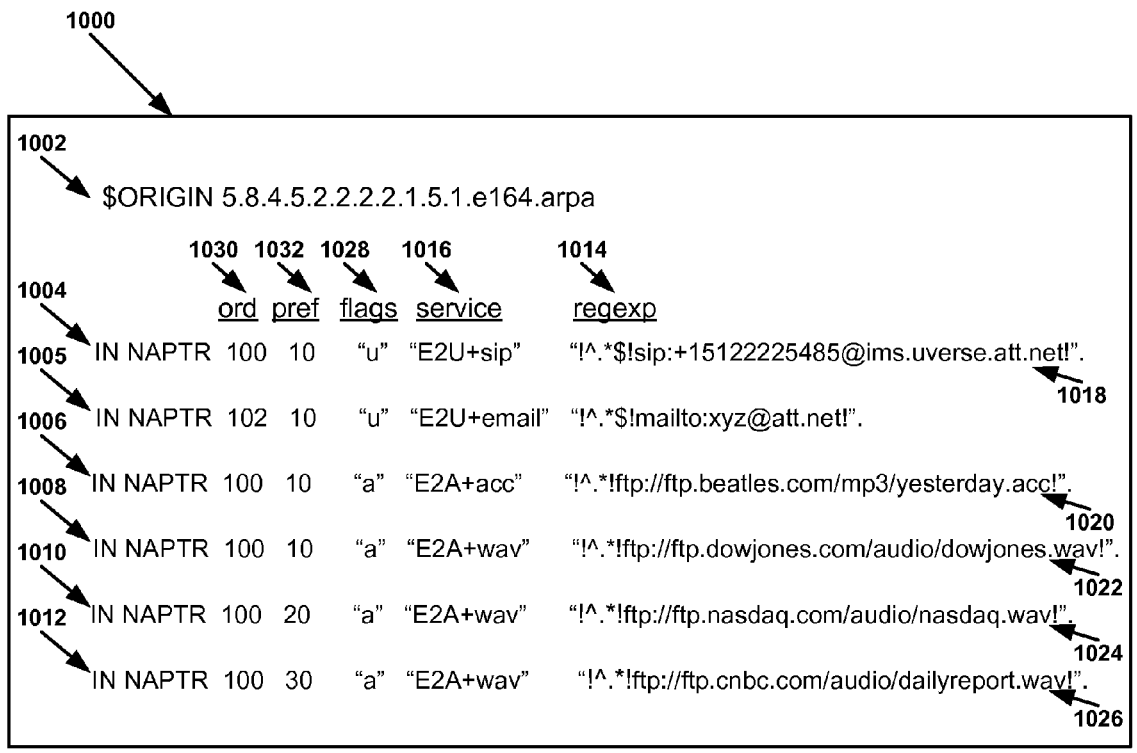
FIG. 10 is a diagram illustrating a particular embodiment of a tElephone NUmber Mapping (ENUM) server response including Naming Authority Pointer (NAPTR) records.

The originating S-CSCF 126 is adapted to translate the E.164 number included with the connection request to a fully qualified domain name (FQDN) associated with the UE2 device 140. For example, the telephone number +1-512-222-5485 may be translated into the FQDN 5.8.4.5.2.2.2.2.1.5.1.e164.arpa. The originating S-CSCF 126 sends a NAPTR records request that includes the FQDN to the ENUM server 134. The ENUM server 134 is adapted to retrieve NAPTR records related to the FQDN included in the NAPTR records request and to send the NAPTR records to the originating S-CSCF 126. The retrieved NAPTR records include at least one SIP URI related to the UE2 device 140 and a plurality of ringback audio (RBA) URIs. The ENUM server 134 is adapted to send a response that includes the retrieved NAPTR records to the originating S-CSCF 126. FIG. 10 illustrates an example of a response that includes NAPTR records.

The originating S-CSCF 126 is adapted to send a connection request to the terminating S-CSCF 146 via the I-CSCF 130. The connection request includes a SIP URI of the UE2 device 140 and the RBA URIs received from the ENUM server 134 in the NAPTR records. The I-CSCF 130 is adapted to send the connection request to the terminating S-CSCF 146. The terminating S-CSCF 146 is adapted to send the connection request to the UE2 device 140 via the terminating P-CSCF 144.

In addition, the terminating S-CSCF 146 is adapted to query an application server 128 for data indicating which of the RBA URIs returned by the ENUM server 134 should be sent to the UE1 device 118 with a modified ringing message. For example, the ENUM server 134 can return one or more first RBA URIs related to personal contacts of the subscriber, one or more second RBA URIs related to a particular caller, and one or more third RBA URIs related to business contacts of the subscriber. The application server 128 can be adapted to determine whether the UE1 device 118 is associated with a personal contact of the subscriber, a particular caller designated by the subscriber, or a business contact of the subscriber, and to select the corresponding RBA URI(s). The application server 128 is adapted to return data indicating the selected RBA URI(s) to the terminating S-CSCF 146. For instance, the application server 128 can be adapted to return data indicating a selection of at least one first RBA URI if the UE1 device 118 is associated with a personal contact of the subscriber in the subscriber profile, a selection of at least one second RBA URI if the UE1 device 118 is associated with a particular caller identified by the subscriber profile, and a selection of at least one third RBA URI if the UE1 device 118 is associated with a business or commercial contact of the subscriber in the subscriber profile. In alternative embodiments, the application server 128 can be adapted to return a default audio URI or no URI, where the UE1 device 118 is not associated with a particular caller or contact type that corresponds to any of the URIs.

After sending the connection request to the UE2 device 140, the terminating S-CSCF 146 is adapted to receive a ringing message from the UE2 device 140 via the terminating P-CSCF 144. If an application server 128 has returned data indicating one or more selected URIs to the terminating S-CSCF 146, the terminating S-CSCF 146 is adapted to modify the ringing message by inserting the selected URI(s) indicated by the application server 128. The modified ringing message can also include an order field value associated with each selected URI, a preference field value associated with each selected URI, other information, or a combination thereof. The terminating S-CSCF 146 is adapted to send the ringing message to the originating S-CSCF 126 via the I-CSCF 130. The originating S-CSCF 126 is adapted to send the ringing message to the UE1 device 118 via the originating P-CSCF 124.

If the ringing message includes one or more RBA URIs, the UE1 device 118 is adapted to request a ringback audio content selection from the ringback audio server 142. The request includes an RBA URI. Where the UE1 device 118 receives multiple RBA URIs, the UE1 device 118 can be adapted to select one of the RBA URIs based on order field values, preference field values, or a combination thereof, associated with the RBA URIs. In one embodiment, the UE1 device 118 is adapted to select a RBA URI associated with a lowest combination of order and preference field values. For instance, if an order field value and preference field value associated with a first RBA URI are [100,10] and an order field value and preference field value associated with a second RBA URI are [100,20], the UE1 device 118 can be adapted to select the first RBA URI based on its lower total (110 versus 120).

The ringback audio server 142 is adapted to determine whether the RBA URI received from the UE1 device 118 corresponds to an RBA URI of an audio content selection stored at the ringback audio server 142. The UE1 device 118 is adapted to receive the requested audio content selection or an error message from the ringback audio server 142. When the requested audio content selection is received, the UE1 device 118 is adapted to output the ringback audio selection via a speaker or other audio interface until the call is answered at the UE2 device 140 or at a voice mail or messaging system. In one embodiment, the UE1 device 118 can be adapted to repeat the audio content selection or request another audio content selection if the audio content selection ends before the call is answered.

In an illustrative embodiment, when the UE1 device 118 receives an error message, the UE1 device 118 is adapted to determine whether one or more other RBA URIs are included with the ringing message. If so, the UE1 device 118 can be adapted to select a next one of the RBA URIs, such as a an RBA URI associated with a next lowest combination of order and preference field values, and to request an audio content selection associated with the next RBA URI from the ringback audio server 142. If there is no additional RBA URI, the UE1 device 118 can be adapted to output a default audio tone. The UE1 device 118 can also be adapted to output the error message via a display portion.

In another embodiment, the UE1 device 118 can be adapted to receive a default audio URI or no URI with the ringing message. The UE1 device 118 can be adapted to retrieve a default audio tone from the ringback audio server 142, from another network element, or from a memory at the UE1 device 118, and to output the default audio tone via a speaker or other audio interface until the call is answered.

Figure 2:
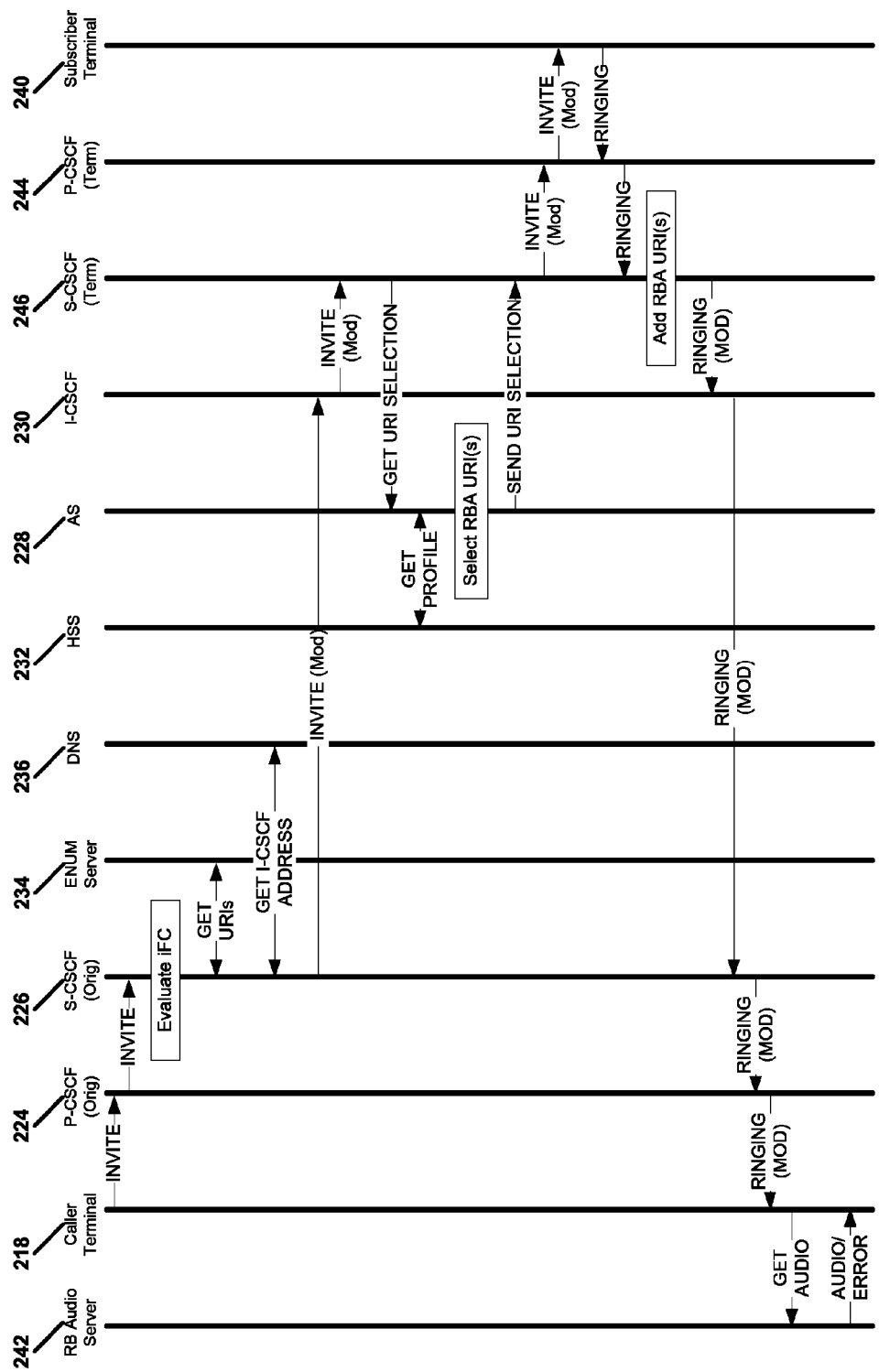
FIG. 2 is a ladder diagram illustrating a second particular embodiment of a system to deliver ringback audio content.

FIG. 2 illustrates a ladder diagram of a second particular embodiment of a system to deliver ringback audio content. As shown in FIG. 2, a caller terminal 218, such as a caller telephone, communicates with an originating serving call session control function (S-CSCF) network element 226 via a proxy CSCF (P-CSCF) network element 224. The caller terminal 218 also communicates with a ringback audio server 242. The originating S-CSCF 226 communicates with a terminating S-CSCF 246 via an interrogating CSCF (I-CSCF) 230. The terminating S-CSCF 246 communicates with a subscriber terminal 240, such as a called party telephone, via a terminating P-CSCF 244. The originating S-CSCF 226 and the terminating S-CSCF 246 also communicate with an application server 228, a home subscriber server (HSS) 232, a telephone number mapping (ENUM) server 234, and a domain name server (DNS) 236. In one embodiment, the originating S-CSCF 226, the application server 228, the HSS 232, the ENUM server 234, the DNS 236, the terminating S-CSCF 246, or any combination thereof, are elements of an Internet Protocol multimedia subsystem (IMS) home network associated with the caller terminal 218 and the subscriber terminal 240.

The originating S-CSCF 226 is adapted to receive a connection request originating from the caller terminal 218 via the originating P-CSCF 224. In one embodiment, the connection request can include a session initiation protocol (SIP) INVITE communication 248. The connection request includes an E.164 number associated with the subscriber terminal 240. In one embodiment, the connection request can also include caller identification information related to the caller terminal 218, other information, or a combination thereof.

In an illustrative embodiment, the originating S-CSCF 226 can be adapted to communicate with the HSS 232 to check and verify registration status, credentials, other profile characteristics, or any combination thereof, associated with the caller terminal 218, such as whether the caller terminal 218 is associated with an authorized IMS user. Further, the originating S-CSCF 226 is adapted to apply initial filter criteria (iFC) to the connection request.

In one embodiment, the originating S-CSCF 226 is adapted to translate the E.164 number included with the connection request to a fully qualified domain name (FQDN) associated with the subscriber terminal 240. The originating S-CSCF 226 sends a naming authority pointer (NAPTR) records request that includes the FQDN to the ENUM server 234. The ENUM server 234 is adapted to retrieve NAPTR records related to the FQDN included in the NAPTR records request and to send the NAPTR records to the originating S-CSCF 226. The retrieved NAPTR records include at least one session initiation protocol (SIP) URI related to the subscriber terminal 240 and a plurality of ringback audio (RBA) URIs. The ENUM server 234 is adapted to send a response that includes the retrieved NAPTR records to the originating S-CSCF 226. FIG. 10 illustrates an example of a response that includes NAPTR records.

The originating S-CSCF 226 is adapted to send a connection request to the terminating S-CSCF 246 via the I-CSCF 230. In an illustrative embodiment, the originating S-CSCF 226 can be adapted to obtain an Internet protocol address of the I-CSCF 230 from the DNS 236. The connection request includes a SIP URI of the subscriber terminal 240 and the RBA URIs received from the ENUM server 234 in the NAPTR records. The I-CSCF 230 is adapted to send the connection request to the terminating S-CSCF 246. The terminating S-CSCF 246 is adapted to send the connection request to the subscriber terminal 240 via the terminating P-CSCF 244.

In addition, the terminating S-CSCF 246 is adapted to query the application server 228 for data indicating which of the RBA URIs returned by the ENUM server 234 should be sent to the caller terminal 218 with a modified ringing message. For example, the ENUM server 234 can return one or more first RBA URIs related to personal contacts of the subscriber, one or more second RBA URIs related to particular callers designated by the subscriber, and one or more third RBA URIs related to business contacts of the subscriber. The application server 228 can be adapted to determine, based on the subscriber profile, whether the caller terminal 218 is associated with a personal contact of the subscriber, a particular caller, or a business contact of the subscriber and to select the corresponding RBA URI(s). In one embodiment, the application server 228 can retrieve a subscriber profile from the HSS 232, from memory at the application server 228, from another application server, from a network address book server, or from another network element. The application server 228 can compare information related to the caller terminal 218 to the subscriber profile to determine whether the caller terminal 218 is associated with a particular caller or contact type designated by the subscriber and can select one or more RBA URIs associated with the particular caller or contact type in the subscriber profile. The application server 228 is adapted to return data indicating the selected RBA URI(s) to the terminating S-CSCF 246. In other embodiments, the application server 228 can be adapted to return a default audio URI or no URI, where the caller terminal 218 is not associated with a caller or contact type that corresponds to any of the URIs.

The terminating S-CSCF 246 is adapted to receive a ringing message from the subscriber terminal 240 via the terminating P-CSCF 244. If the application server 228 has returned data indicating one or more selected URIs to the terminating S-CSCF 246, the terminating S-CSCF 246 is adapted to modify the ringing message by inserting the URI(s). The modified ringing message can also include order field values, preference field values, other information, or any combination thereof. The terminating S-CSCF 246 is adapted to send the ringing message to the originating S-CSCF 226 via the I-CSCF 230. The originating S-CSCF 226 is adapted to send the ringing message to the caller terminal 218 via the originating P-CSCF 224.

If the ringing message includes one or more RBA URIs, the caller terminal 218 is adapted to request a ringback audio content selection from the ringback audio server 242. The request includes an RBA URI. Where the caller terminal 218 receives multiple RBA URIs, the caller terminal 218 can be adapted to select one of the RBA URIs based on order field values, preference field values, or a combination thereof, associated with the RBA URIs. In one embodiment, the caller terminal 218 can be adapted to select an RBA URI associated with a lowest combination of order and preference field values. For instance, if an order field value and preference field value associated with a first RBA URI are [100,10] and an order field value and preference field value associated with a second RBA URI are [100,20], the caller terminal 218 can be adapted to select the first RBA URI based on its lower total (110 versus 120).

The ringback audio server 242 is adapted to determine whether the RBA URI received from the caller terminal 218 corresponds to an RBA URI of an audio content selection stored at the ringback audio server 242. The caller terminal 218 is adapted to receive the requested audio content selection or an error message from the ringback audio server 242. When the requested audio content selection is received, the caller terminal 218 is adapted to output the ringback audio selection via a speaker or other audio interface.

In an illustrative embodiment, when the caller terminal 218 receives an error message, the caller terminal 218 is adapted to determine whether one or more other RBA URIs are included with the ringing message. If so, the caller terminal 218 can be adapted to select a next one of the RBA URIs, such as a an RBA URI associated with a next lowest combination of order and preference field values, and to request an audio content selection associated with the next RBA URI from the ringback audio server 242. If there is no additional RBA URI, the caller terminal 218 can be adapted to output a default audio tone. The caller terminal 218 can also be adapted to output the error message via a display portion.

In another embodiment, the caller terminal 218 can be adapted to receive a default audio URI or no URI with the ringing message. The caller terminal 218 can be adapted to retrieve a default audio tone from the ringback audio server 242, from another network element, or from a memory at the caller terminal 218, and to output a default audio tone via a speaker or other audio interface.

Figure 3:
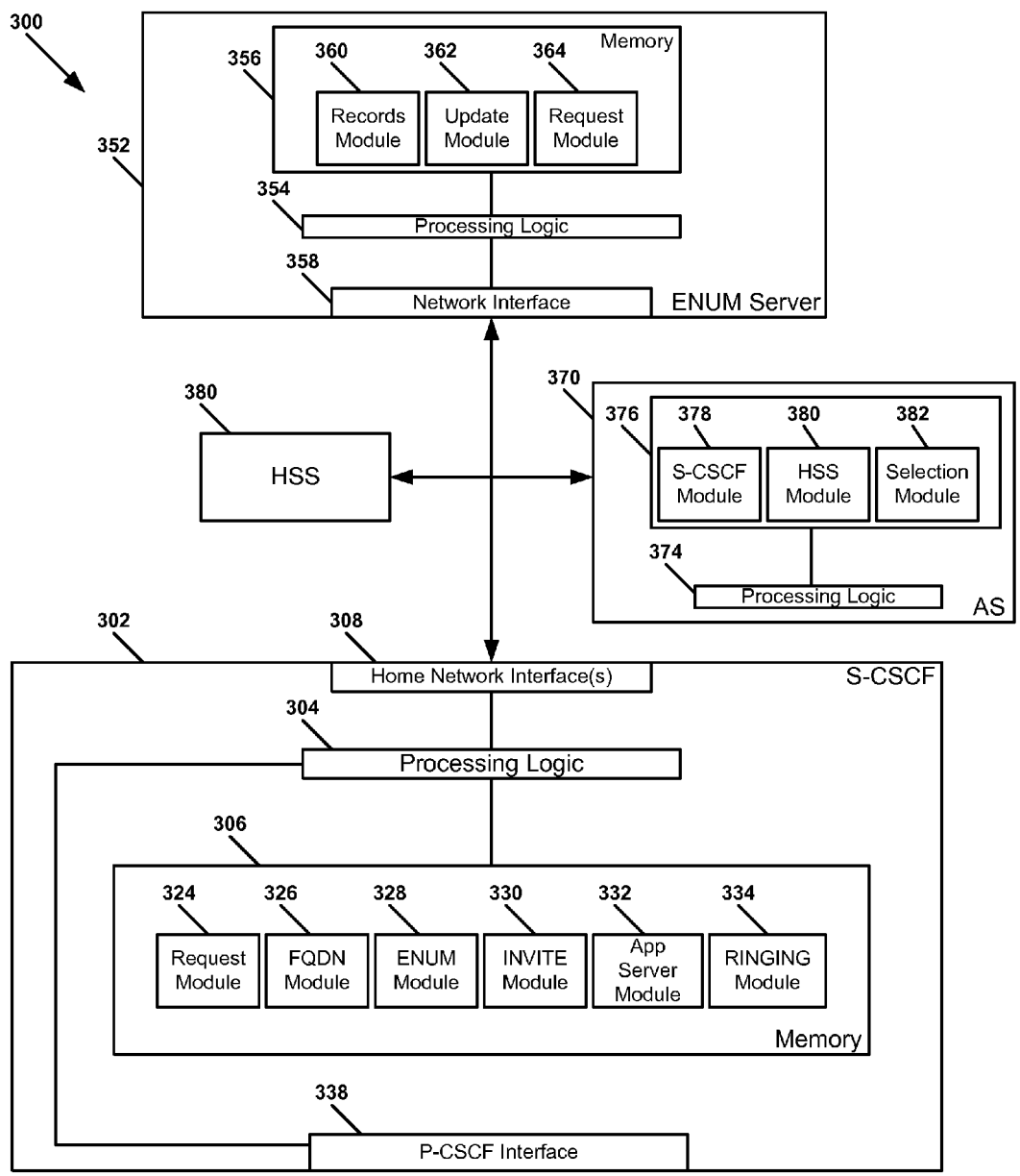
FIG. 3 is a block diagram illustrating a third particular embodiment of a system to deliver ringback audio content.

FIG. 3 illustrates a third particular embodiment of a system 300 to deliver ringback audio content. The system 300 includes a serving call session control function (S-CSCF) server 302 that communicates with a telephone number mapping (ENUM) server 352. The S-CSCF server 302 also communicates with a plurality of application servers 370 and a home subscriber server (HSS) 380. The S-CSCF server 302 includes processing logic 304 and memory 306 accessible to the processing logic 304. The S-CSCF server 302 also includes one or more home network interfaces 308 that are adapted to facilitate communication between the S-CSCF server 302 and other elements of a home network, such as the ENUM server 352, the application servers 370, and the home subscriber server 380. The S-CSCF server 302 also includes a proxy call session control function (P-CSCF) interface 338 adapted to communicate with at least one P-CSCF server of an IP multimedia subsystem (IMS) according to a session initiation protocol (SIP).

In a particular embodiment, the memory 306 includes a plurality of modules 324-334. The modules 324-334 can include computer instructions that are readable and executable by the processing logic 304 to implement various functions of the S-CSCF server 302 with respect to delivering ringback audio content, where the S-CSCF server 302 functions as an originating S-CSCF or a terminating S-CSCF, depending on the origin of a call. For example, the modules 324-334 can represent various aspects of one or more software applications, operating systems, or other computer programs. In other embodiments, the modules 324-334 can be implemented as hardware logic or a combination of hardware logic and computer instructions.

The memory 306 includes a request module 324 that is executable by the processing logic 304 to receive a connection request related to a call originating from a caller device. The connection request can be received from a P-CSCF communicating with the caller device, via the P-CSCF interface 338. The connection request can be a session initiation protocol (SIP) INVITE communication and includes an E.164 number associated with a destination device of an audio content service subscriber, to which the call is being placed. The connection request can include other information, such as caller identification information.

The memory 306 also includes a fully qualified domain name (FQDN) module 326 that is executable by the processing logic 304 to translate an E.164 number included with the connection request received from the caller device, to an FQDN associated with the destination device. The memory 306 also includes an ENUM module 328 that is executable by the processing logic 304 to send a NAPTR records request including a FQDN to the ENUM server 352 and to receive NAPTR records related to the FQDN from the ENUM server 352. The NAPTR records include at least one SIP URI related to the destination device and a plurality of ringback audio (RBA) URIs associated with the destination device. FIG. 10 shows an example of a response including such NAPTR records.

The memory 306 includes an INVITE module 330 that is executable by the processing logic 304, when the S-CSCF server 302 is acting as an originating S-CSCF, to send a connection request to a terminating S-CSCF. The connection request includes a SIP URI of the destination device. The connection request is modified to include the RBA URIs received from the ENUM server 352 in the NAPTR records. The INVITE module 330 is also executable by the processing logic 304 to send such a connection request to the destination device via the P-CSCF interface 338, when the S-CSCF server 302 is acting as a terminating S-CSCF.

The memory 306 includes an application server communication module 332 that is executable by the processing logic 304, when the S-CSCF server 302 is acting as a terminating S-CSCF, to query the application server(s) 370 for data indicating which of the RBA URIs returned by the ENUM server 352 should be sent to the caller device with a modified ringing message. For example, the ENUM server 352 can return one or more first RBA URIs related to personal contacts of the subscriber, one or more second RBA URIs related to a particular caller designated by the subscriber, and one or more RBA URIs related to business contacts of the subscriber. The application server(s) 370 can be adapted to determine whether the caller device is associated with a personal contact of the subscriber, a particular caller designated by the subscriber, or a business contact of the subscriber and to select the corresponding RBA URI(s). The S-CSCF server 302 can receive data from the application server(s) 370 indicating a selection of one or more first RBA URIs from the NAPTR records, if the caller device is associated with a personal contact of the subscriber, a selection of one or more second RBA URIs if the caller device is associated with a particular caller, and a selection of one or more third RBA URIs from the NAPTR records, if the caller device is associated with a business or commercial contact of the subscriber. In other embodiments, the S-CSCF server 302 can receive a default audio URI or no URI, where the caller device is not associated with a particular caller or contact type that corresponds to any of the URIs.

The memory 306 includes a RINGING module 334 that is executable by the processing logic 304 to receive a RINGING message from the destination device, when the S-CSCF server 302 is acting as a terminating S-CSCF. The RINGING module 334 is executable by the processing logic 304 to modify the RINGING message to include the RBA URIs selected by the application server(s) 370 and to send the RINGING message to an originating S-CSCF communicating with the caller device. The modified RINGING message can also include order field and preference field values associated with each RBA URI. If the caller device is not associated with a particular caller or contact type designated by the subscriber, the RINGING module 334 is executable by the processing logic 304 to include a URI of a default ringback audio tone with the RINGING message, or to include no URI or a null URI with the RINGING message. The RINGING module 334 is executable by the processing logic 304 to send a RINGING message received from a terminating S-CSCF to a caller device, when the S-CSCF server 302 is acting as an originating S-CSCF.

The ENUM server 352 includes processing logic 354 and memory 356 accessible to the processing logic 354. The ENUM server 352 also includes a network interface 358 that is adapted to facilitate communication between the ENUM server 352 and other elements of the home network, such as the S-CSCF server 302, the application server(s) 370, and the home subscriber server 380.

In a particular embodiment, the memory 356 includes a plurality of modules 360, 362 and 364. The modules 360, 362 and 364 can include computer instructions that are readable and executable by the processing logic 354 to implement various functions of the ENUM server 352 with respect to delivering ringback audio content. For example, the modules 360, 362 and 364 can represent various aspects of one or more software applications, operating systems, or other computer programs In other embodiments, the modules 360, 362 and 364 can be implemented as hardware logic or a combination of hardware logic and computer instructions.

The memory 356 includes a records module 360 that is executable by the processing logic 354 to generate NAPTR records associated with various FQDNs. The records module 360 can store the NAPTR records. Further, the memory 356 includes an update module 362 that is executable by the processing logic 354 to scan the application server(s) 370, the HSS 380, or a combination thereof, for updated information related to ringback audio content of subscribers to the ringback audio content service. For example, updates can include an updated RBA URI, an updated order field value, an updated preference field value, an added contact, an added contact type, an added caller, a deleted contact, a deleted caller, a deleted contact type, other information, or any combination thereof, via a web portal communicating with the application server(s) 370, with the HSS 380, or a combination thereof. Additionally, updates may include profiles that new subscribers create, where the new profiles include RBA URIs and related information. The update module 362 is executable by the processing logic 354 to update one or more NAPTR records based on updates detected during a scan. In one example, the update module 362 can be executable by the processing logic 354 to make a latest updated RBA URI of a subscriber first in priority within NAPTR records corresponding to the subscriber with respect to a particular caller or type of contact.

The memory 356 includes a request module 364 that is executable by the processing logic 354 to receive a NAPTR records request from an originating S-CSCF, such as the S-CSCF server 302. The request module 364 is executable by the processing logic 354 to retrieve NAPTR records related to a FQDN included in the NAPTR records request. The NAPTR records can be retrieved from memory 356 at the ENUM server 352. The retrieved NAPTR records include at least one SIP URI related to the destination device and a plurality of RBA URIs. The request module 364 is executable by the processing logic 354 to send the retrieved NAPTR records to the originating S-CSCF.

In a particular embodiment, the application server 370 includes processing logic 374 and memory 376 accessible to the processing logic 374. The memory 376 includes a plurality of modules 378-382. The modules 378-382 can include computer instructions that are readable and executable by the processing logic 374 to implement various functions of the application server 370 with respect to delivering ringback audio content. For example, the modules 378-382 can represent various aspects of one or more software applications, operating systems, or other computer programs In other embodiments, the modules 378-382 can be implemented as hardware logic or a combination of hardware logic and computer instructions.

The memory 376 includes an S-CSCF module 378 that is executable by the processing logic 374 to receive a request from the S-CSCF server 302 for data indicating a selection of one or more RBA URIs from a plurality of RBA URIs received with a connection request. The memory 376 also includes an HSS module 380 that is executable by the processing logic 374 to identify a destination device associated with the connection request and to retrieve a subscriber profile associated with the destination device from the HSS 380.

In addition, the memory 376 includes a selection module 382 that is executable by the processing logic 374 to determine whether a caller device matches a particular caller or a contact type associated with the subscriber profile, such as a personal contact type, business contact type or other contact type. If the caller device does not match a particular caller or a contact type, the selection module 382 is executable by the processing logic 374 to select a default ringback audio URI, a null URI or no URI. Conversely, if the caller device matches a particular caller or a contact type, the selection module 382 is executable by the processing logic 374 to select one or more RBA URIs from the plurality of RBA URIs based on the particular caller or contact type. For instance, the selection module 382 can be executable by the processing logic 374 to select one or more first RBA URIs if the caller device is associated with a personal contact of the subscriber, to select one or more second RBA URIs if the caller device is associated with a particular caller designated by the subscriber, and to select one or more third RBA URIs if the caller device is associated with a business contact of the subscriber. The S-CSCF module 378 is executable by the processing logic 374 to send data indicating the selected RBA URIs to the S-CSCF server 302.

Figure 4:
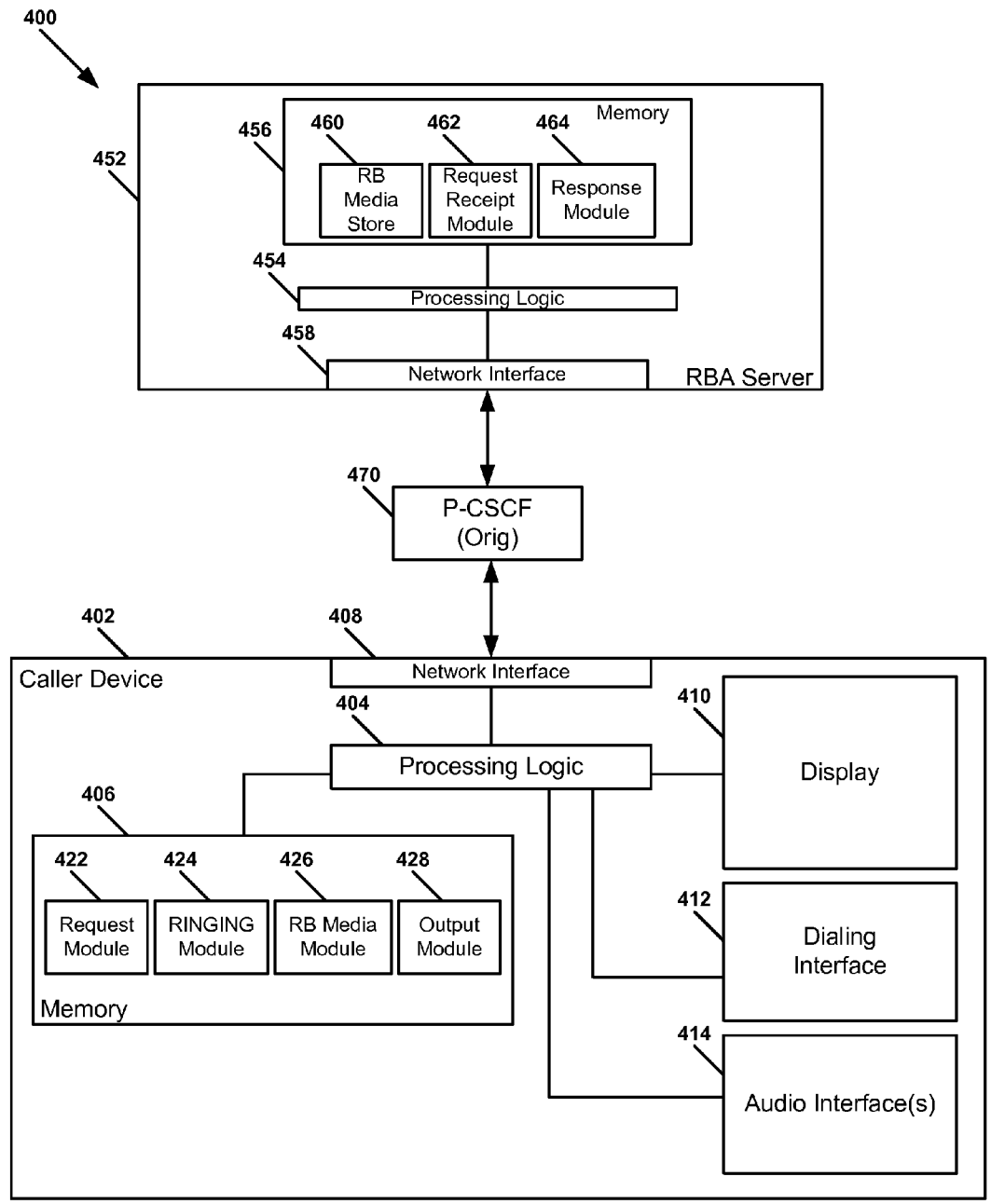
FIG. 4 is a block diagram illustrating a fourth particular embodiment of a system to deliver ringback audio content.

FIG. 4 illustrates a fourth embodiment of a system 400 to deliver ringback audio content. The system 400 includes a voice communication device, such as the caller device 402, which communicates with a ringback video server 452 via a proxy call session control function (P-CSCF) network element 470. The caller device 402 includes processing logic 404 and memory 406 accessible to the processing logic 404. The caller device 402 also includes a network interface 408 adapted to facilitate communication between the caller device 402 and the P-CSCF 470 via a communications network, such as an Internet protocol multimedia subsystem (IMS). Further, the caller device 402 includes a display portion 410, which may include a display screen, video processing logic, or a combination thereof. In addition, the caller device 402 includes a dialing interface 412, such as a keypad, voice-activated dialing interface, other dialing interface, or any combination thereof. Moreover, the caller device 402 includes at least one audio interface 414, such as a speaker, a handset, a headphone, or a combination thereof.

In a particular embodiment, the memory 406 includes a plurality of modules 422-428. The modules 422-428 can include computer instructions that are readable and executable by the processing logic 404 to implement various functions of the caller device 402 with respect to delivering ringback audio content. For example, the modules 422-428 can represent various aspects of one or more software applications, operating systems, or other computer programs In other embodiments, the modules 422-428 can be implemented as hardware logic or a combination of hardware logic and computer instructions.

The memory 406 includes a request module 422 that is executable by the processing logic 404 to place a call after receiving an E.164 number of a destination device via the dialing interface 412. The request module 422 is executable by the processing logic 404 to send a connection request to an originating serving call session control function (S-CSCF) network element via the P-CSCF 470. The connection request includes the E.164 number of the destination device.

The memory 406 includes a RINGING module 424 that is executable by the processing logic 404 to receive a modified RINGING message that includes at least one uniform resource indicator (URI) of a ringback audio (RBA) selection. Further, the memory 406 includes a ringback media module 426 that is executable by the processing logic 404 to select a RBA URI received with the ringing message. For instance, where a plurality of RBA URIs are received with the RINGING message, the ringback media module 426 can be executable by the processing logic 404 to select a RBA URI corresponding to a lowest combination of order field and preference field values. The ringback media module 426 is executable by the processing logic 404 to query the ringback audio server 452 for the ringback audio selection associated with the selected URI.

The memory 406 includes an output module 428 that is executable by the processing logic 404 to output ringback media depending on a response received from the ringback audio server 452. Such a response can include an audio content selection or an error message (e.g., where the selected RBA URI does not correspond to a video selection at the ringback audio server 452). Where the response includes the audio content selection, the output module 428 is executable by the processing logic 404 to output the selection at the display portion 410. In a particular embodiment, the output module 428 can be executable by the processing logic 404 to stop outputting the ringback audio content selection if the ringback audio content selection is not completed when the call is answered. In another embodiment, the output module 428 can be executable by the processing logic 404 to repeat the ringback audio content selection if the ringback audio content selection has ended before the call is answered. A user can configure treatment of ringback audio content selections in relation to answered calls at the caller device 402.

In an illustrative embodiment, when the caller device 402 receives an error message, the ringback media module 426 is executable by the processing logic 404 to determine whether one or more other RBA URIs are included with the ringing message. If so, the ringback media module 426 is executable by the processing logic 404 to select a next one of the RBA URIs, such as an RBA URI associated with a next lowest combination of order and preference field values, and to request an audio content selection associated with the next RBA URI from the ringback video server 452. If there is no additional RBA URI, the ringback media module 426 is executable by the processing logic 404 to output a default audio tone. The output module 428 can also be adapted to output the error message via the display portion 410.

In another embodiment, the caller device 402 can receive a default audio URI, null URI or no URI with the ringing message. The ringback media module 426 is executable by the processing logic 404 to retrieve a default audio tone from the ringback audio server 452, from another network element, or from the memory 406, and to output a default audio tone via the audio interface(s) 414. The output module 428 is executable by the processing logic 404 to stop outputting the default ringback audio tone when the call is answered at the destination device or terminated at the caller device 402.

The ringback video server 452 includes processing logic 454 and memory 456 accessible to the processing logic 454. In an illustrative embodiment, the ringback video server 452 also includes a network interface 458 adapted to facilitate communication between the ringback video server 452 and the P-CSCF 470. In a particular embodiment, the memory 456 includes a plurality of modules 460-464. The modules 460-464 can include computer instructions that are readable and executable by the processing logic 454 to implement various functions of the ringback audio server 452 with respect to delivering ringback audio content. For example, the modules 460-464 can represent various aspects of one or more software applications, operating systems, or other computer programs In other embodiments, the modules 460-464 can be implemented as hardware logic or a combination of hardware logic and computer instructions.

The memory 456 includes a ringback (RB) media store 460 to store ringback audio content selections associated with RBV URIs. In addition, the ringback media store 460 can store one or more default ringback audio tones. The memory 456 also includes a request receipt module 462 that is executable by the processing logic 454 to receive queries from caller devices, such as the caller device 402, for ringback audio content selections, for default ringback audio tones, or a combination thereof. The request receipt module 462 that is executable by the processing logic 454 to determine whether a RBA URI received from the caller device 402, for example, corresponds to a RBA URI of a ringback audio content selection stored at the ringback media store 460. Further, the memory includes a response module 464 that is executable by the processing logic 454 to send responses to caller devices. A response can include a ringback audio content selection, a default ringback audio tone, or an error message (e.g., when no ringback audio content selection is found for a requested RBA URI).

Figure 5:
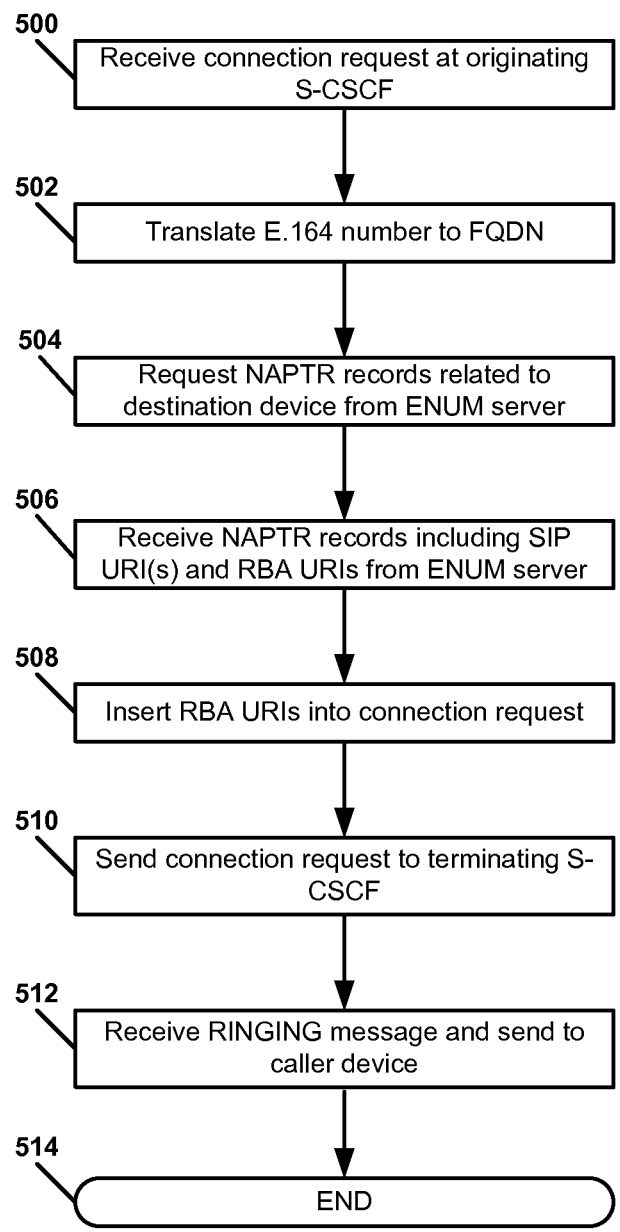
FIG. 5 is a flow diagram illustrating a particular embodiment of a method of delivering ringback audio content.

FIG. 5 illustrates a particular embodiment of a method of delivering ringback audio content. At block 500, a serving call session control function (S-CSCF) network element at a home network of an Internet Protocol multimedia subsystem (IMS) receives a connection request from a caller device. The connection request includes an E.164 number of a destination device and may also include other information, such as caller identification information.

Moving to block 502, the S-CSCF translates the E.164 number received with the connection request to a fully qualified domain name (FQDN) associated with the destination device. Advancing to block 504, the S-CSCF sends a naming authority pointer (NAPTR) records request including the FQDN of the destination device to a telephone number mapping (ENUM) server. Proceeding to block 506, the S-CSCF receives NAPTR records related to the FQDN from the ENUM server. The NAPTR records include at least one SIP uniform resource indicator (URI) and a plurality of ringback audio (RBA) URIs.

At block 508, the S-CSCF inserts the plurality of RBA URIs included with the NAPTR records into the connection request. Moving to block 510, the S-CSCF sends the modified or unmodified connection request to a terminating S-CSCF that communicates with the destination device. In a particular embodiment, the S-CSCF sends the connection request via a SIP URI included in the NAPTR records.

Moving to block 512, the S-CSCF receives a RINGING message from the terminating S-CSCF and sends the RINGING message to the caller device. The RINGING message may be modified to include one or more of the plurality of RBA URIs, wherein the selected RBA URI(s) are associated with a particular caller or a type of contact designated by a ringback audio content service subscriber corresponding to the destination device. The method terminates at 514.

Figure 6:
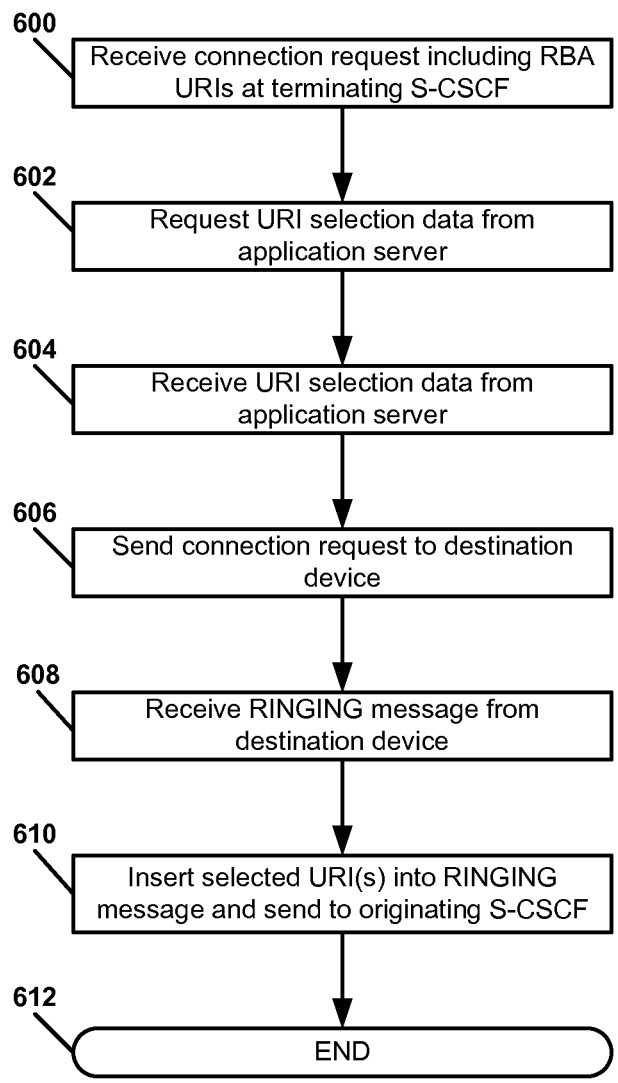
FIG. 6 is a flow diagram illustrating a second particular embodiment of a method of delivering ringback audio content.

FIG. 6 illustrates a second particular embodiment of a method of delivering ringback audio content. At block 600, a serving call session control function (S-CSCF) of an Internet Protocol multimedia subsystem (IMS) receives a connection request from an originating S-CSCF. The connection request relates to a call placed from a caller device communicating with the originating S-CSCF, to a destination device that communicates with the S-CSCF, such that the S-CSCF functions as a terminating S-CSCF. The connection request includes a plurality of ringback audio uniform resource indicators (RBA URIs) associated with a subscriber corresponding to the destination device.

Moving to block 602, the S-CSCF requests URI selection data from an application server associated with the IMS. Proceeding to block 604, the S-CSCF receives URI selection data from the application server. The selection data indicates one or more URIs that are to be sent to the caller device. The selected URI(s) may include one or more of the RBA URIs corresponding to a particular caller or a contact type, a default audio ringback tone URI, or a null URI.

Continuing to block 606, the S-CSCF sends the connection request to the destination device. Advancing to block 608, the S-CSCF receives a RINGING message from the destination device. At block 610, the S-CSCF inserts the selected URI(s) indicated by the application server into the RINGING message. Order field values, preference field values, other information related to the URI(s), or any combination thereof, can also be inserted into the RINGING message. The S-CSCF sends the modified RINGING message to the originating S-CSCF. The method terminates at 612.

Figure 7:
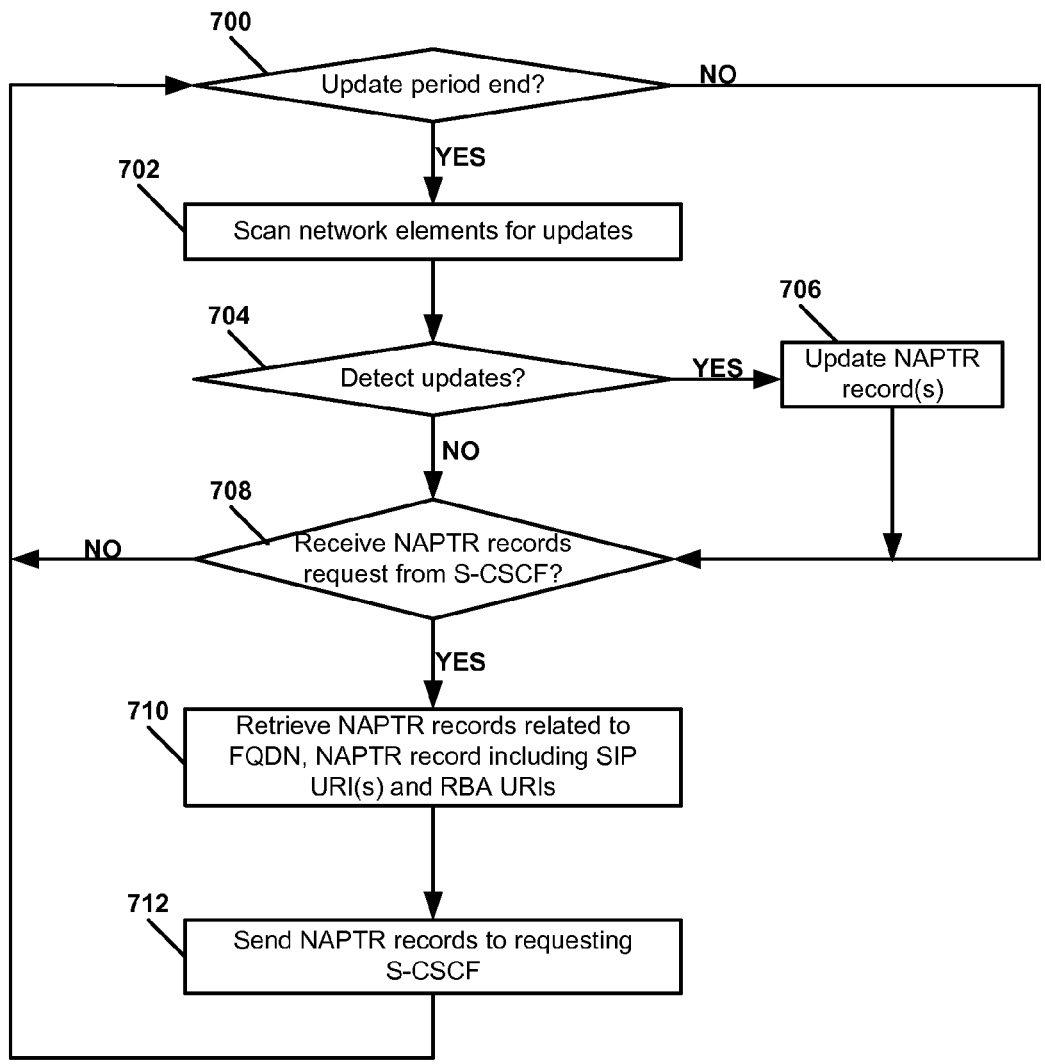
FIG. 7 is a flow diagram illustrating a third particular embodiment of a method of delivering ringback audio content.

FIG. 7 illustrates a third particular embodiment of a method of delivering ringback audio content. At decision node 700, a telephone number mapping (ENUM) server determines whether a naming authority pointer (NAPTR) records updating period has ended. If the NAPTR records updating period has not ended, the method moves to decision node 708. Conversely, if the ENUM server determines that the NAPTR records updating period has ended, the method moves to block 702, and the ENUM server scans a home subscriber server (HSS), at least one application server (AS), another network element, or a combination thereof, for updated information related to ringback audio (RBA) of subscribers to a ringback audio service. For example, updates can include one or more RBA uniform resource indicators (URIs), order and preference information related to an updated RBA URI, an updated order field value, an updated preference field value, an added caller, a deleted caller, an added contact, an added contact type, a deleted contact, a deleted contact type, other information, or any combination thereof, via a web portal communicating with the HSS, application servers, or a combination thereof. Additionally, updates may include profiles that new subscribers create, where the new profiles include RBA URIs and related information.

Proceeding to decision node 704, the ENUM server determines whether it detects updates during its scan. If the ENUM server does not detect updates, the method advances to decision node 708. On the other hand, if the ENUM server detects updates, the method continues to block 706, and the ENUM server updates one or more NAPTR records stored at the ENUM server, based on the updates. In one example, the ENUM server can make a latest updated RBA URI first in priority within corresponding NAPTR records for a particular caller or type of contact. The method then advances to decision node 708.

At decision node 708, the ENUM server determines whether it has received a NAPTR records request from a serving call session control function (S-CSCF) server. If the ENUM server has not received such a request, the method can return to decision node 700. Whereas, if the ENUM server has received a NAPTR records request, the method moves to block 710, and the ENUM server can retrieve NAPTR records related to a fully qualified domain name (FQDN) of a destination device, where the FQDN is included in the NAPTR records request. The retrieved NAPTR records include at least one session initiation protocol (SIP) URI related to the called device and a plurality of RBA URIs. Proceeding to block 712, the ENUM server sends the retrieved NAPTR records to the requesting S-CSCF server. The method then returns to decision node 700.

Figure 8:
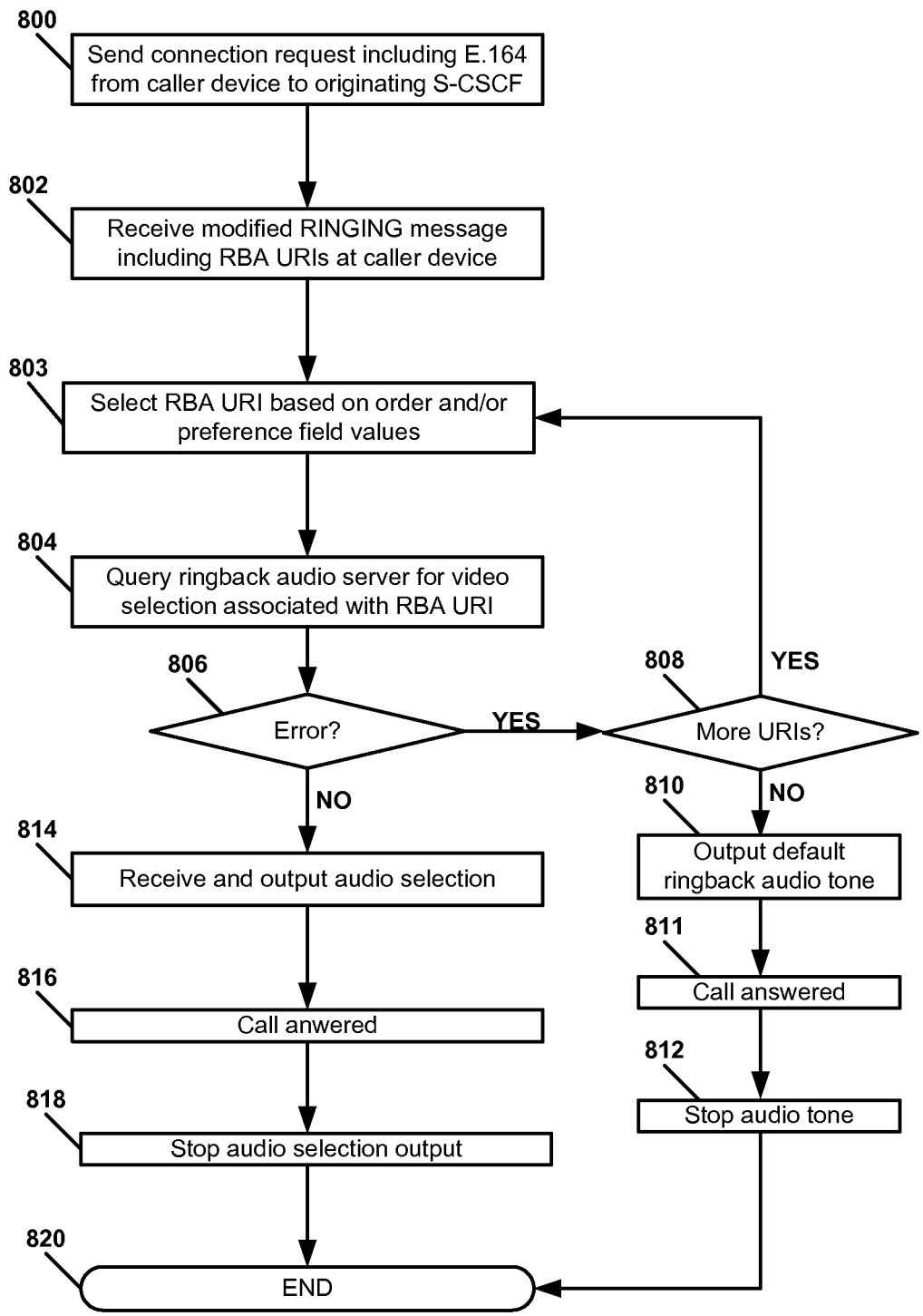
FIG. 8 is a block diagram illustrating a fourth particular embodiment of a method of delivering ringback audio content.

FIG. 8 illustrates a fourth embodiment of a method of delivering ringback audio content. At block 800, a caller device places a call by sending a connection request to an originating serving call session control function (S-CSCF) network element. The connection request includes an E.164 number of a destination device. Moving to block 802, the caller device receives a modified RINGING message that includes a plurality of uniform resource indicators (URIs). Proceeding to block 803, the caller device selects one of the plurality of ringback audio (RBA) URIs based on order and preference field values associated with each RBA URI. For instance, the caller device can select a RBA URI associated with a lowest total of order field and preference field values.

Continuing to block 804, the caller device queries a ringback audio server for a ringback audio content selection associated with the selected RBA URI. Continuing to decision node 806, the caller device determines whether it receives an error message from the ringback audio server (e.g., if the ringback audio server finds no audio content selection having the selected RBA URI). If the caller device receives an error message, the method advances to decision node 808, and the caller device determines whether additional URIs are included in the RINGING message. If one or more additional URIs are included, the method can return to block 803, and the caller device can select a next RBA URI.

If no additional RBA URIs are included in the RINGING message, the method advances to block 810, and the caller device outputs a default ringback audio tone, which may be stored at the caller device or retrieved from the ringback audio server or another network element communicating with the caller device. At block 811, the call is answered, and the caller device stops outputting the default ringback audio tone at block 812. The method then terminates at 820.

Returning to decision node 806, if the caller device does not receive an error message from the ringback video server, the method advances to block 814. At block 814, the caller device receives and outputs a ringback audio content selection from the ringback audio server. Proceeding to block 816, the call is answered at the destination device or at a voice mail system or other automated answering system. Continuing to block 818, the caller device stops outputting the audio content selection. The method terminates at 820.

Figure 9:
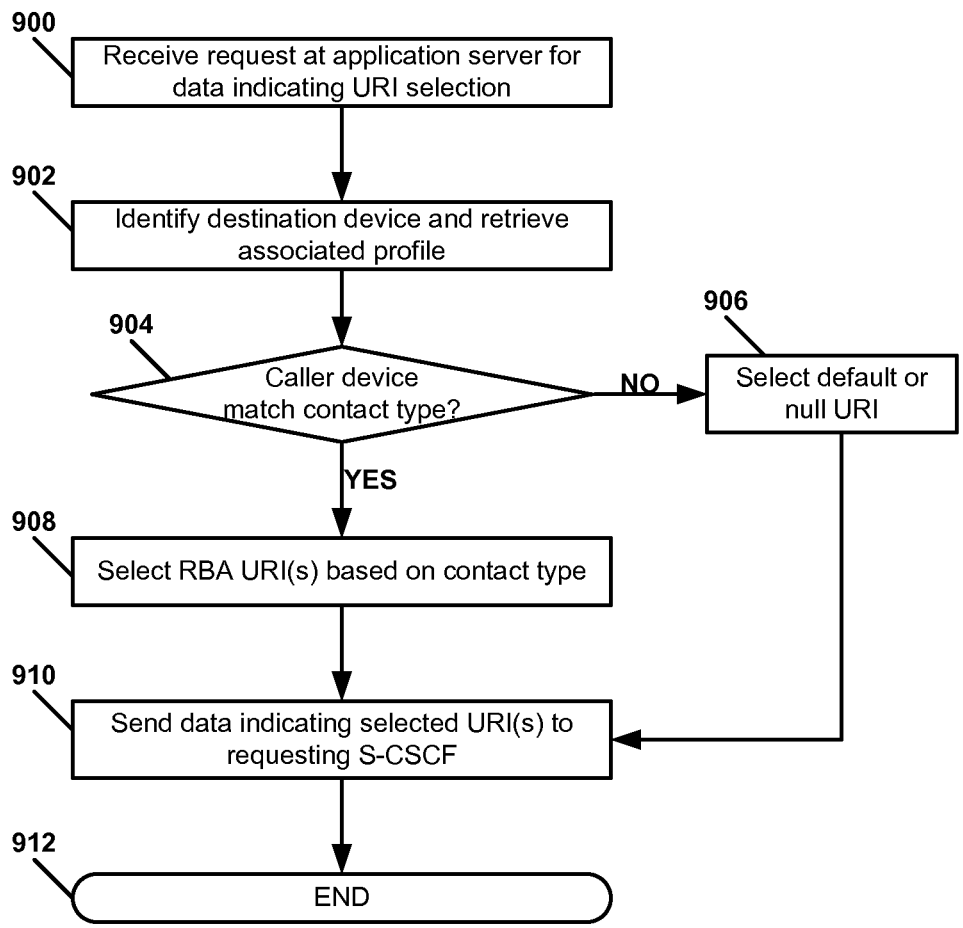
FIG. 9 is a block diagram illustrating a fifth particular embodiment of a method of delivering ringback audio content.

FIG. 9 illustrates a fifth particular embodiment of a method of delivering ringback audio content. At block 900, an application server of an Internet protocol multimedia subsystem (IMS) receives a request, from a terminating serving call session control function (S-CSCF) network element, for data indicating a selection of one or more ringback audio uniform resource indicators (RBA URIs) from a plurality of RBA URIs received with a connection request at the terminating S-CSCF. Moving to block 902, the application server identifies a destination device associated with the connection request (e.g., based on caller identification information included in the connection request) and retrieves a subscriber profile associated with the destination device from a home subscriber server (HSS) of the IMS, for instance.

Proceeding to decision node 904, the application server determines whether a caller device matches a particular caller or a contact type associated with the subscriber profile, such as a personal contact type, business contact type or other contact type. If the caller device does not match a particular caller or a contact type, the method continues to block 906, and the application server selects a default ringback audio URI or a null URI. The method then advances to block 910. Conversely, if the caller device matches a particular caller or a contact type, the method continues to block 908, and the application server selects one or more RBA URIs from the plurality of RBA URIs based on the particular caller or contact type. Moving to block 910, the application server sends data indicating the selected RBA URIs to the terminating S-CSCF. The method terminates at 912.

In some embodiments, the methods disclosed herein can be performed as described with reference to FIGS. 5-9. In other embodiments, aspects of the methods can be performed in alternative sequences or simultaneously.

FIG. 10 illustrates an illustrative embodiment of a response 1000 to a naming authority pointer (NAPTR) records request. The response 1000 can be returned by a telephone number mapping (ENUM) server in response to a NAPTR records request received from a serving call session control function (S-CSCF) server or similar network element of an IP multimedia subsystem (IMS). The response 1000 identifies a fully qualified domain name (FQDN) 1002 received with the request and includes a plurality of NAPTR records 1004, 1005, 1006, 1008, 1010 and 1012 associated with the FQDN 1002.

Each NAPTR record includes a uniform resource indicator (URI) 1014 associated with a service 1016. For example, a first NAPTR record 1004 includes a session initiation protocol (SIP) URI 1018 associated with a SIP service designated as "E2U+sip." The SIP URI 1018 is an address of a ringback audio content service subscriber device, to which a SIP INVITE can be sent. A second NAPTR record 1005 can include a second SIP URI. In another example, a third NAPTR record 1006 includes a first ringback audio (RBA) URI 1020 associated with a ringback audio service designated as "E2V+acc." The service value relates the E.164 number to audio ("E2A") and specifies a protocol that can be used for personal contacts (acc). The first RBA URI 1020 is an address that is to be sent to a caller device associated with a personal contact of the subscriber.

The NAPTR records 1008, 1010, and 1012 can include other RBA URIs 1022, 1024, and 1026 associated with a ringback video service designated as "E2V+way." The service value relates the E.164 number to audio ("E2A") and specifies a protocol that can be used for another type of contact, such as business contacts (way). The RBA URIs 1022, 1024 and 1026 include addresses that can be sent to caller devices associated with a business contact of the subscriber. In other embodiments, the response 1000 can include additional NAPTR records having URIs that can be sent to devices associated with other types of contacts. These NAPTR records can include services other than "E2A+acc" and "E2A+wav," such as an "E2A+mp3" service.

FIG. 10 illustrates that each service 1016 can be associated with a flag 1028, such as a SIP flag ("u"), an audio flag ("a"), or another type of flag. In addition, each NAPTR record includes an order field 1030 and a preference field 1032. The order field 1030, the preference field 1032, or a combination thereof, can define a sequence in which URIs are to be applied to a call in the course of providing each service. For instance, if a business contact ringback audio service E2A+wav is to be applied to a call, the RBA URI 1022 will be sent to a caller device first, due to its lowest combination of order field and preference field values (i.e., 110). If additional ringback audio is required (e.g., the called party is on the phone, network delay occurs, etc.) the next preferred RBA URI 1024 can be sent to the caller device, and so on. In one embodiment, a latest updated RBA URI can be associated with a lowest preference field value, a lowest order field value, or combination thereof.

Figure 11:
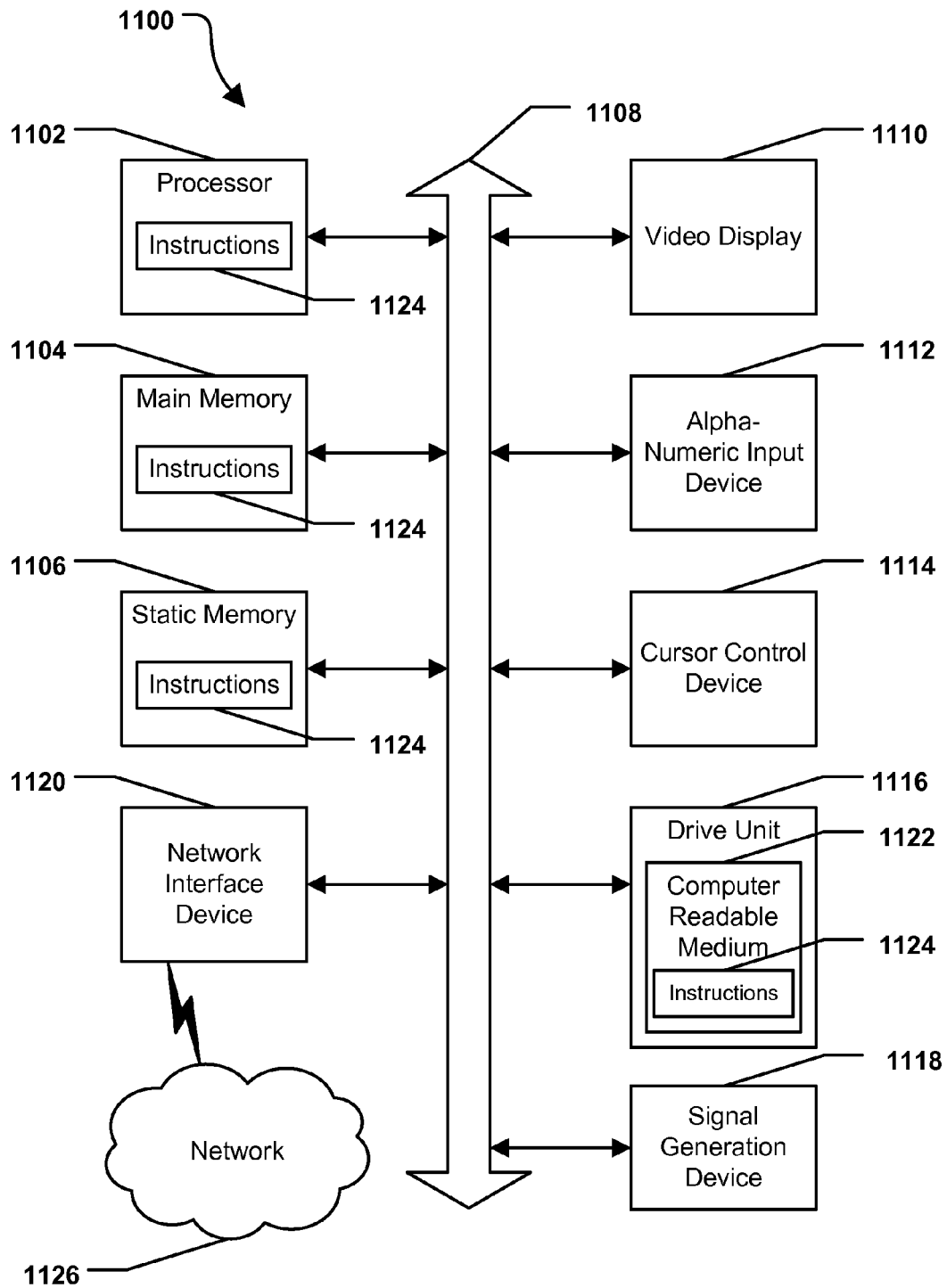
FIG. 11 is a diagram of an illustrative embodiment of a general computer system.

FIG. 11 illustrates an embodiment of a general computer 1100 including a set of instructions that can be executed to cause the computer system to perform any one or more of the methods or computer based functions disclosed herein. The computer system 1100 may operate as a standalone device or may be connected, e.g., using a network, to other computer systems or peripheral devices. In an illustrative embodiment, such standalone and peripheral devices can include, for example, session initiation protocol (SIP) servers, telephone number mapping (ENUM) servers, caller devices, destination devices, application servers, home subscriber servers, ringback audio servers, other network elements associated with an IP multimedia subsystem (IMS), or any combination thereof, as illustrated in FIGS. 1-4.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, e.g., a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media. The network interface device 1120 can provide connectivity to a network 1126, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system for delivering ringback audio content, the system comprising:
    a servicing call session control function network element, the servicing call session control function network element comprising:
        a memory that stores instructions;
        a processor that executes the instructions to perform operations comprising:
            receiving a connection request indicating that a caller device has placed a call to a destination device;
            accessing a naming authority pointer record, wherein the naming authority pointer record includes a ringback audio uniform resource indicator associated with the destination device;
            inserting the ringback audio uniform resource indicator into the connection request; and
            modifying a ringing message received from the destination device to include the ringback audio uniform resource indicator, wherein the ringing message is modified based, at least in part, on the connection request.

2. The system of claim 1, wherein the operations further comprise transmitting the ringback audio resource indicator to the caller device based on receiving the ringing message from the destination device.

3. The system of claim 1, wherein the operations further comprise transmitting the connection request containing the ringback audio uniform resource indicator to a terminating servicing call session control function.

4. The system of claim 1, wherein the operations further comprise receiving the naming authority pointer record from a telephone number mapping server.

5. The system of claim 1, wherein the operations further comprise translating an E.164 number associated with the connection request to a fully qualified domain name associated with the destination device.

6. The system of claim 5, wherein the operations further comprise transmitting a naming authority pointer records request including the fully qualified domain name to a telephone number mapping server to access the naming authority pointer record.

7. The system of claim 1, wherein the call to the destination device is associated with a ringback audio content service subscriber.

8. The system of claim 1, wherein the operations further comprise modifying the ringing message to include the ringback audio uniform resource indicator at a terminating servicing call session control function.

9. A method for delivering ringback audio content, the method comprising:
    sending a connection request to a servicing call session control function network element, wherein the connection request indicates that a caller device has placed a call to a destination device;
    receiving a modified ringing message including a session initiation protocol uniform resource indicator and a selected uniform resource indicator; and
    querying, by utilizing instructions from memory that are executed by a processor, a ringback audio server for an audio content selection associated with the selected uniform resource indicator,
    wherein the querying is performed when the selected uniform resource indicator includes a ringback audio uniform resource indicator associated with a profile of a ringback audio content service subscriber associated with the destination device, and
    wherein the ringback audio uniform resource indicator includes a sequence indicator that identifies a sequence of a plurality of ringback audio uniform resource indicators associated with the ringback audio uniform resource indicator.

10. The method of claim 9, further comprising receiving an error message from the ringback audio server if the ringback audio server does not find the audio content selection associated with the selected uniform resource indicator.

11. The method of claim 10, further comprising determining if there are additional uniform resource indicators in the modified ringing message if the error message is received.

12. The method of claim 11, further comprising selecting a next uniform resource indicator from the additional uniform resource indicators if the additional uniform resource indicators are in the modified ringing message.

13. The method of claim 11, further comprising outputting a default ringback audio tone if there are no additional uniform resource indicators in the modified ringing message.

14. The method of claim 13, further comprising terminating output of the default ringback audio tone when the call is answered.

15. The method of claim 9, further comprising querying the ringback audio server for a next audio content selected associated with a next ringback audio uniform resource indicator.

16. A computer readable device including instructions, which when loaded an executed by a processor, cause the processor to perform operations comprising:
receiving a connection request indicating that a caller device has placed a call to a destination device;
accessing a naming authority pointer record, wherein the naming authority pointer record includes a ringback audio uniform resource indicator associated with the destination device;
inserting the ringback audio uniform resource indicator into the connection request; and
modifying a ringing message received from the destination device to include the ringback audio uniform resource indicator, wherein the ringing message is modified based, at least in part, on the connection request.

17. The computer readable device of claim 16, wherein the operations further comprise modifying the ringing message to include the ringback audio uniform resource indicator at a terminating servicing call session control function.

18. The computer readable device of claim 16, wherein the operations further comprise transmitting the ringback audio resource indicator to the caller device based on receiving the ringing message from the destination device.

19. The computer readable device of claim 16, wherein the operations further comprise transmitting a naming authority pointer records request including a fully qualified domain name to a telephone number mapping server so as to access the naming authority pointer record.

20. The computer readable device of claim 16, wherein the ringback audio uniform resource indicator includes a sequence indicator that identifies a sequence of a plurality of ringback audio uniform resource indicators associated with the ringback audio uniform resource indicator.

* * * * *